United States Patent
Kaku

(10) Patent No.: US 7,688,988 B2
(45) Date of Patent: Mar. 30, 2010

(54) PARTICULAR IMAGE AREA PARTITIONING APPARATUS AND METHOD, AND PROGRAM FOR CAUSING COMPUTER TO PERFORM PARTICULAR IMAGE AREA PARTITIONING PROCESSING

(75) Inventor: Toshihiko Kaku, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1021 days.

(21) Appl. No.: 11/390,154

(22) Filed: Mar. 28, 2006

(65) Prior Publication Data

US 2006/0165286 A1 Jul. 27, 2006

Related U.S. Application Data

(63) Continuation-in-part of application No. 11/147,289, filed on Jun. 8, 2005.

(30) Foreign Application Priority Data

Jun. 17, 2004 (JP) ............................ 2004-179081

(51) Int. Cl.
*G06K 9/34* (2006.01)
(52) U.S. Cl. ....................................................... 381/173
(58) Field of Classification Search ................... 382/173
See application file for complete search history.

(56) References Cited

U.S. PATENT DOCUMENTS

| 4,967,079 | A  | * | 10/1990 | Shimura ...................... 250/586 |
| 5,923,781 | A  | * | 7/1999  | Csipkes et al. .............. 382/199 |
| 7,039,222 | B2 | * | 5/2006  | Simon et al. ................. 382/118 |
| 2003/0053685 | A1 | * | 3/2003 | Lestideau ................... 382/164 |
| 2004/0267102 | A1 | * | 12/2004 | Skladnev et al. ............ 600/315 |

FOREIGN PATENT DOCUMENTS

JP        2002-203239 A      7/2002

* cited by examiner

*Primary Examiner*—Wenpeng Chen
(74) *Attorney, Agent, or Firm*—Sughrue Mion, PLLC

(57) ABSTRACT

It is detected whether or not a face image is included in an image represented by applied image data. When the face image is detected, an image area including the detected face image is cut out. A plurality of rectangular projection information creating windows are set radially from the center of the cut image. With respect to each of image portions within the plurality of projection information creating windows, projection information is created and the projection information is converted into data representing the distance from an ideal skin color. With respect to each of the image portions within the plurality of projection information creating windows, a boundary position between a skin color image and an image other than the skin color image is determined on the basis of the distance data for each unit pixel position.

19 Claims, 14 Drawing Sheets

MASK AREA

PARTICULAR IMAGE AREA PARTITIONING APPARATUS AND METHOD, AND PROGRAM FOR CAUSING COMPUTER TO PERFORM PARTICULAR IMAGE AREA PARTITIONING PROCESSING

CROSS-REFERENCE TO RELATED APPLICATION

This application is a Continuation-In-Part of application Ser. No. 11/147,289 filed Jun. 8, 2005. The entire disclosure of the prior application, application Ser. No. 11/147,289 is hereby incorporated by reference.

BACKGROUND OF THE INVENTION

1. Field of the Invention

The present invention relates to a particular image area partitioning apparatus and method, and a program for causing a computer to perform particular image area partitioning processing, and more specifically, to an apparatus for and a method of suitably partitioning off a particular image portion included in an image represented by image data (determining, demarcating or judging a boundary between a particular image portion and the other portion, or detecting or extracting the particular image portion).

2. Description of the Background Art

An image represented by digital image data is displayed on a display screen of a display device, and is printed on printing paper by a printer. The image represented by the digital image data is visibly displayed on the display screen or the printing paper. In order to reproduce the image displayed on the display screen or the printing paper more beautifully (or faithfully), the digital image data is subjected to various types of correction processing such as white balance correction and gamma correction in a digital camera, a printer, a personal computer, etc.

The image data may, in some cases, be subjected to correction processing by paying attention to a particular image portion included in the image. When the image includes the face of a character (person), an image portion of the face of the character is used as an object to perform correction processing such as white balance correction and gamma correction such that the face of the character is more beautifully (faithfully) represented.

In order to subject the image data representing the particular image portion included in the image (e.g., the image portion of the face of the character) to correction processing, the particular image portion must be detected (extracted, cut out, bounded, partitioned off, demarcated) from the entire image. In JP-A-2002-203239, a skin candidate area is first detected, and main face features (eyes, eyebrows, hair, nose, and mouth) in the detected skin candidate area are then detected, to detect a face image included in the image. However, face images included in all images are not constant in direction or size. In a detecting method based on the face features (eyes, eyebrows, hair, nose, and mouth), detection may fail. As to detection of the skin candidate area, when the color of a background is close to a skin color, detection of the area (boundary) may fail.

SUMMARY OF THE INVENTION

An object of the present invention is to partition off a particular image area included in an image from the other image area (determine an area boundary) more accurately.

A particular image area partitioning apparatus according to the present invention is characterized by comprising particular image detection means (device) for detecting whether or not a particular image is included in an image represented by applied image data; projection information creation means (device) for setting, when the particular image is detected by the particular image detection means, a plurality of projection information creating windows having a predetermined shape radially from the center of the image represented by the image data including the detected particular image, and creating, with respect to each of image portions within the set plurality of projection information creating windows, projection information obtained by adding pixel information for each unit pixel position in the radial direction from the center of the image; boundary position determination means (device) for determining, with respect to each of the image portions within the plurality of projection information creating windows, a boundary position between the particular image and an image other than the particular image on the basis of the projection information for each unit pixel position obtained by the projection information creation means (device); and particular area determination means (device) for determining a particular image area by connecting the plurality of boundary positions, adjacent to one another, determined by the boundary position determination means (device).

A method of partitioning a particular image area according to the present invention is characterized by comprising the steps of detecting whether or not a particular image is included in an image represented by applied image data; setting, when the particular image is detected, a plurality of projection information creating windows having a predetermined shape radially from the center of the image represented by the image data including the detected particular image, and creating, with respect to each of image portions within the set plurality of projection information creating windows, projection information obtained by adding pixel information for each unit pixel position in the radial direction from the center of the image; determining, with respect to each of the image portions within the plurality of projection information creating windows, a boundary position between the particular image and an image other than the particular image on the basis of the created projection information for each unit pixel position; and determining a particular image area by connecting the determined plurality of boundary positions adjacent to one another.

The present invention also provides a program for causing a computer to carry out the above-mentioned method (a program for causing a computer to function as the particular image area partitioning apparatus). The program is for causing a computer to perform processing for detecting whether or not a particular image is included in an image represented by image data applied from a storage device (a hard disk, a memory card, a CD-ROM, etc.); processing for setting, when the particular image is detected, a plurality of projection information creating windows having a predetermined shape radially from the center of the image represented by the image data including the detected particular image, and creating, with respect to each of image portions within the set plurality of projection information creating windows, projection information obtained by adding pixel information for each unit pixel position in the radial direction from the center of the image; processing for determining, with respect to each of the image portions within the plurality of projection information creating windows, a boundary position between the particular image and an image other than the particular image on the basis of the created projection information for each unit pixel position; and processing for determining a particular image area by connecting the determined plurality of boundary positions adjacent to one another. All the processings may be performed by a CPU included in the computer, or some of the processings may be performed by a dedicated hardware device.

When a particular image exists in an image represented by applied image data (hereinafter referred to as an input image), the particular image is detected. The particular image means an image portion, having a particular shape, structure, features, color, etc., included in the input image, for example, an image portion representing the face of a character (person). The image portion representing the face of the character included in the input image is detected by pattern matching, for example.

Preferably, the particular image area partitioning apparatus comprises cutout means (device) for cutting out from the image data, when the particular image is detected by the particular image detection means, image data representing an area including the detected particular image and slightly extending from the particular image (a part of the input image, for example, a rectangular area image). In this case, the cut image data representing the area including the cut particular image (cut image data) is used for the subsequent processing. The center of the cut image is positioned on the particular image almost reliably.

A plurality of projection information creating windows having a predetermined shape are set radially from the center of the image represented by the image data including the detected particular image (or the cut image).

The plurality of projection information creating windows set radially from the center of the image have a width (length) and a height. As described later, the projection information creating window is a unit area for detecting (determining) a boundary position between the particular image area included in the input image and the other image area. The boundary position between the particular image area and the other image area must exist in each of the image portions within the projection information creating windows. The width (the length in the radial direction) of the projection information creating window is set from this viewpoint. The height of the projection information creating window can be arbitrarily determined from the viewpoint of processing speed, processing precision, etc.

The projection information creating window may be rotated through a predetermined angle at a time with the center of the input image (or the cut image) as its axis, to set the plurality of projection information creating windows radially, or the input image data (or the cut image data) itself may be rotated through a predetermined angle at a time with the center of the input image (or the cut image) as its axis, to set the plurality of projection information creating windows radially.

Projection information is created with respect to each of the image portions in the set projection information creating windows. The created projection information is obtained by adding pixel information for each unit pixel position in the radial direction from the center of the image.

The projection information creating window has a width and a height, as described above, and the width direction thereof corresponds to the radial direction. The image portion within the projection information creating window includes pixels in the width direction (pixels in the row direction) and pixels in the height direction (pixels in the column direction). In other words, the addition of the pixel information for each unit pixel position in the radial direction from the center of the input image (or the cut image) means adding, with respect to each of the image portions within the projection information creating windows, the pixel information for each unit pixel position in the height direction (the column direction) of the projection information creating window. The unit pixel position may be one pixel or a plurality of pixels.

Pixel information is data representing the brightness (concentration) and the color of an image such as YCrCb data (luminance data (Y), red color difference data (Cr), and blue color difference data (Cb)), RGB data or the like for each unit pixel position. For example, YCrCb data is taken as an example. The created projection information is composed of an added value of the luminance data (Y) for each unit pixel position, an added value of the red color difference data (Cr) for each unit pixel position, and an added value of the blue color difference data (Cb) for each unit pixel position. Assuming that the unit pixel is one pixel, and the width of the projection information creating window is composed of 128 pixels, for example, each of the added value of the luminance data (Y), the added value of the red color difference data (Cr), and the added value of the blue color difference data (Cb), which is an added value of pixel information for each unit pixel position, is a set of 128 added values (added pixel information).

On the basis of the projection information for each unit pixel position obtained by the projection information creation means, the boundary position between the particular image and the image other than the particular image is determined in each of the plurality of projection information creating windows set radially from the center of the input image (cut image). By connecting the determined plurality of boundary positions adjacent to one another, a particular image area is determined. Instead of determining the particular image area by connecting the determined plurality of boundary positions adjacent to one another, an image portion obtained by combining respective image portions inside the boundary positions determined with respect to the image portions within the plurality of projection information creating windows may be a particular image area.

According to the present invention, the plurality of projection information creating windows (having a width and a height) having a predetermined shape are set radially from the center of the input image (or the cut image), and the boundary position between the particular image and the image other than the particular image is determined for each of the image portions within the set plurality of projection information creating windows. The boundary position is based on the projection information for each unit pixel position (information obtained by adding the pixel information for each unit pixel position in the radial direction from the center of the input image (cut image)). For example, the pixel position at which a value representing the projection information is greatly displaced is determined as the boundary position. The projection information is created for each of the image portions within the projection information creating windows, and the boundary position is determined using the created projection information, thereby making it possible to detect (determine), even if an unclear boundary (pixels corresponding to the unclear boundary) is included in a part of the image portion within the projection information creating window, the boundary position between the particular image and the image other than the particular image almost accurately if the boundary can be detected in the other image portion within the projection information creating window. The effect of the unclear boundary (the pixels corresponding to the unclear boundary) can be excluded.

Preferably, the particular image area partitioning apparatus further comprises conversion means (device) for converting each of the plurality of projection information created by the projection information creation means into data representing the distance between the added pixel information, for each unit pixel position, included in the projection information and particular pixel information to be included in the particular image. In this case, the boundary position determination means determines, with respect to each of the image portions within the plurality of projection information creating windows, a boundary position between the particular image and the image other than the particular image on the basis of the distance data for each unit pixel position obtained by the conversion means.

Assuming that the projection information is composed of an added value of luminance data (Y), an added value of red color difference data (Cr), and an added value of blue color difference data (Cb) (added pixel information), which are obtained from an input image (cut image), the distance between the added value (added pixel information) and (ideal) particular pixel information (naturally composed of luminance data (Y), red color difference data (Cr), and blue color difference data (Cb)) to be included in the particular image (the distance in a color space (including brightness)) is calculated for each unit pixel position. For example, the projection information is converted into a set of data representing the distance from the particular pixel information (information representing particular brightness and a particular color) for each unit pixel position. The boundary position between the particular image and the image other than the particular image is determined with respect to each of the image portions within the plurality of projection information creating windows on the basis of the distance data for each unit pixel position obtained by the conversion means. For example, the pixel position at which the distance data most greatly varies is determined to be the boundary position between the particular image and the image other than the particular image on the basis of a plurality of distance data at the plurality of pixel positions adjacent to one another.

The boundary position is determined on the basis of the distance in the color space (including brightness), thereby making it possible to detect the boundary position if the color (and brightness) slightly differs. Even when an image having a color (and brightness) similar to the particular image exists adjacent to the particular image area to be determined, therefore, the boundary position can be detected almost accurately.

Preferably, the projection information creating window is set so as to be overlapped with the other projection information creating window adjacent thereto. Even if determination (detection) of a boundary position fails with respect to the image portion within the projection information creating window set in one direction, the effect on the determination of the position of the particular image area finally obtained by the (inaccurate) boundary position whose determination (detection) has failed can be reduced if determination (detection) of a correct boundary position succeeds with respect to the image portion within the adjacent projection information creating window in the other direction. Of course, in a case where the pixel information in the vicinity of the determined boundary position entirely differs from the pixel information (particular pixel information) to be included in the particular image, the effect on the determination of the position of the particular image area finally obtained by the boundary position whose determination (detection) has failed can be completely excluded if the boundary position is excluded from the connection of the adjacent boundary positions in finally determining the particular image area.

A particular image area partitioning apparatus according to the present invention can be also defined as follows. That is, the particular image area partitioning apparatus according to the present invention comprises projection information creation means (device) for setting a plurality of projection information creating windows each having such a predetermined shape that its one end is positioned at an arbitrary point on a particular image included in an image represented by applied image data and the other end is positioned on an image other than the particular image radially from the arbitrary point, and creating projection information obtained by adding, with respect to each of image portions within the set plurality of projection information creating windows, pixel information for each unit pixel position in the radial direction from the arbitrary point; boundary position determination means (device) for determining, with respect to each of the image portions within the plurality of projection information creating windows, a boundary position between the particular image and the image other than the particular image on the basis of the projection information for each unit pixel position obtained by the projection information creation means (device); and particular area determination means (device) for determining a particular image area by connecting the plurality of boundary positions, adjacent to one another, determined by the boundary position determination means (device).

The one end (arbitrary point) of the projection information creating window is positioned on the particular image, and the other end thereof is positioned on the image other than the particular image. That is, the projection information creating window crosses the boundary position to be determined.

In one embodiment, the particular image area partitioning apparatus comprises a display device that displays the image represented by the applied image data, and an input device that accepts designation of the arbitrary point on the particular image included in the image displayed on the display device. The display device and the input device are used so that the one end (arbitrary point) of the projection information creating window is designated on the particular image by a user.

The designation of an arbitrary area on the particular image included in the image displayed on the display device may be accepted from the input device, and an arbitrary portion in the designated arbitrary area may be determined as the above-mentioned arbitrary point.

The designation of an area including the particular image included in the image displayed on the display device and slightly extending from the particular image may be accepted from the input device, and the center (the approximate center) of the designated area may be determined as the above-mentioned arbitrary point.

More preferably, the input of the data for defining the length (the width) of the projection information creating window is further accepted from the input device. The user may be caused to directly input the length of the projection information creating window using a numerical value. Data for indirectly defining the length of the projection information creating window can be also inputted by causing the user to input the position at the other end of the projection information creating window (the position on the image other than the particular image).

In another embodiment, the particular image area partitioning apparatus comprises means (device) for determining the arbitrary point utilizing characteristics inherent in the particular image included in the image represented by the applied image data. For example, in a case where the particular image is a face image representing the face of a character, the arbitrary point determination means detects the positions of both the eyes and the mouth of the character included in the face image and determine as the arbitrary point an arbitrary portion within a triangular area connecting the detected eyes and mouth. The arbitrary point (one end of the projection information creating window) can be automatically determined.

The foregoing and other objects, features, aspects and advantages of the present invention will become more apparent from the following detailed description of the present invention when taken in conjunction with the accompanying drawings.

DESCRIPTION OF THE PREFERRED EMBODIEMNTS

Figure 1:
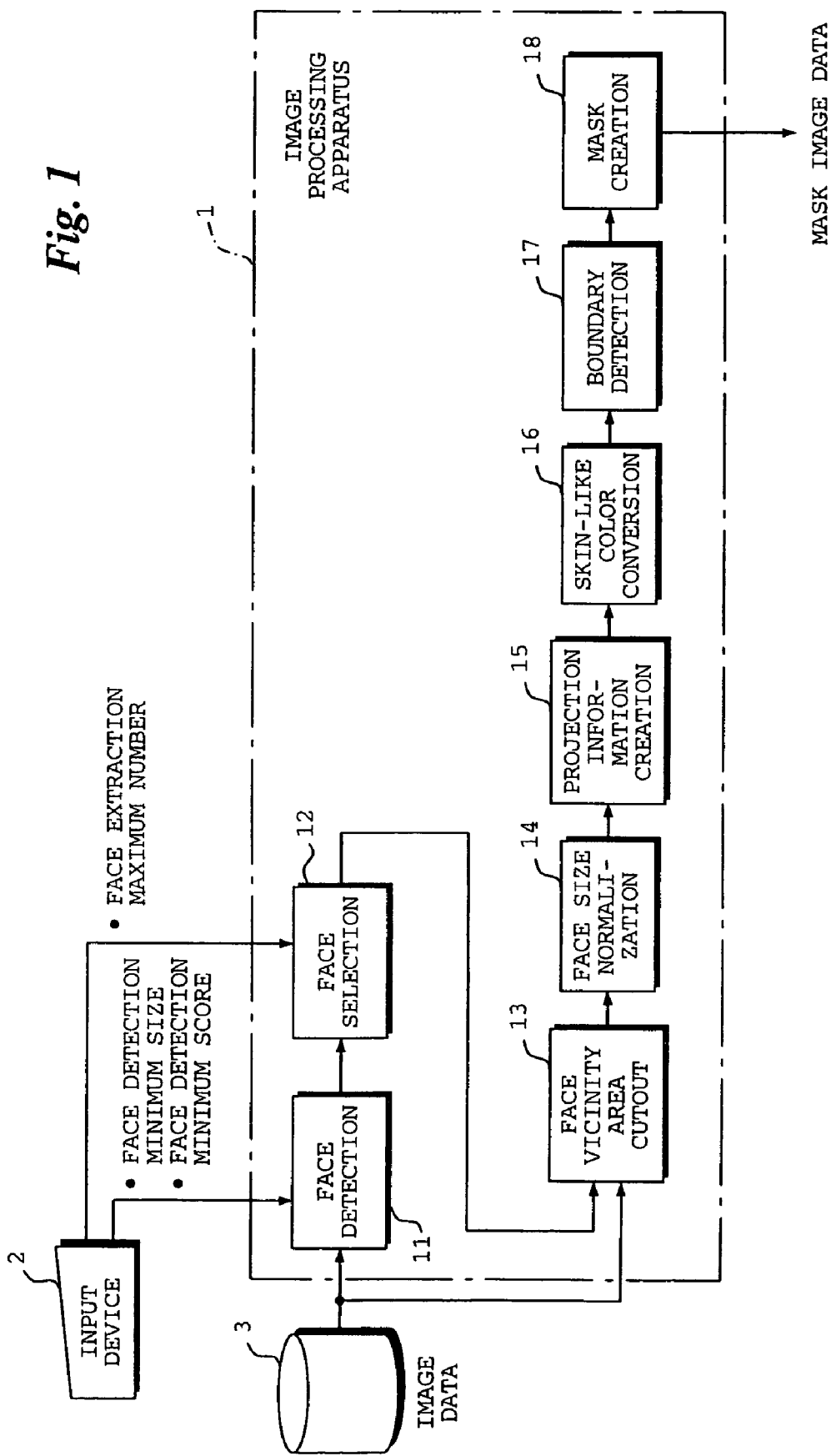
FIG. 1 is a block diagram showing the electrical configuration of an image processing apparatus according to a first embodiment.
Figure 2:
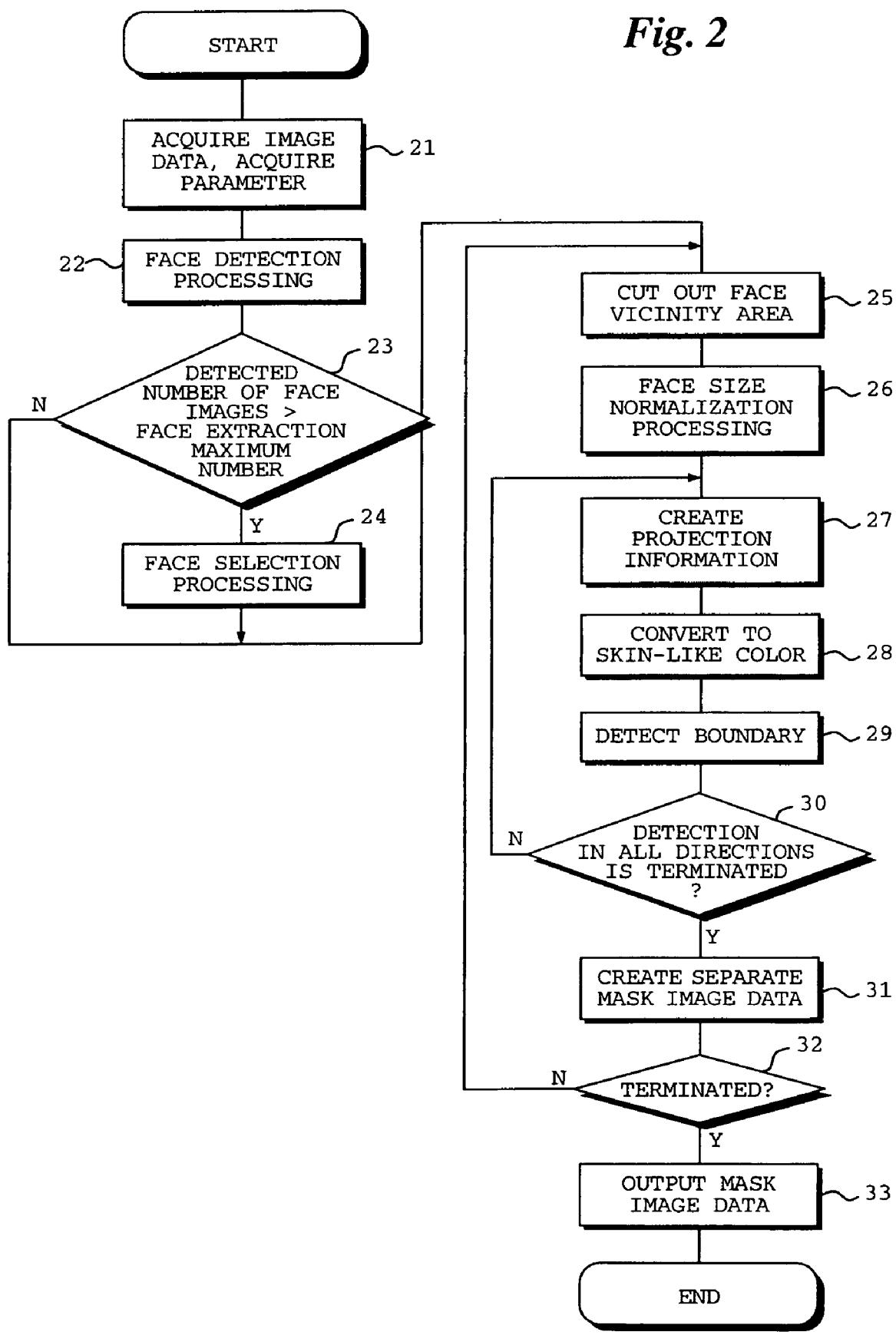
FIG. 2 is a flow chart showing the flow of processing performed by the image processing apparatus according to the first embodiment.

FIG. 1 is a block diagram showing the electrical configuration of an image processing apparatus 1 according to a first embodiment. FIG. 2 is a flow chart showing the flow of operations of the image processing apparatus 1.

An input device 2 (a keyboard, a mouse, etc.) is connected to the image processing apparatus 1. The input device 2 is used to input three parameters (a face detection minimum size, a face detection minimum score, and a face extraction maximum number), described below. Further, a storage device 3 (a hard disk, a flexible disk, a CD-ROM, a memory card, etc.) is connected to the image processing apparatus 1. Image data stored in the storage device 3 is read out, and the read image data is applied to the image processing apparatus 1 (image data read out of the storage device 3 and applied to the image processing apparatus 1 is referred to as "input image data", and an image represented by the input image data is referred to as an "input image") (step 21).

The face detection minimum size and the face detection minimum score that are inputted from the input device 2 are applied to a face detection circuit 11. The face extraction maximum number is applied to a face selection circuit 12.

The face detection circuit 11 detects whether or not a face image is included in the input image by pattern matching. Since the face of a character has a substantially elliptical shape, a pattern (generally, a plurality of patterns) having an elliptical shape is prepared, and is used to perform the pattern matching.

The face detection minimum size that is applied to the face detection circuit 11 represents the size of the minimum face image to be detected in face detection processing. Face images of sizes smaller than the face detection minimum size are excluded from a detection object. The face detection minimum size is inputted (designated) by the number of pixels or by a ratio to the size of an image represented the applied image data.

In the face detection circuit 11, when a matching score obtained by the pattern matching is not less than a predetermined score, it is judged that the face image is detected. The face detection minimum score that is applied to the face detection circuit 11 represents the predetermined score (the minimum score of the matching score on which it is judged that the face image is detected).

The face extraction maximum number is used for selecting, when a plurality of face images are included in the input image, and the plurality of face images are detected by the face detection circuit 11, the face image to be extracted (to be subjected to the subsequent processing) out of the detected face images. When the number of face images detected by the face detection circuit 11 is more than the face extraction maximum number, the face image corresponding to the face extraction maximum number are selected out of the face images, and processing relating to the selected face images is performed.

The face detection minimum size, the face detection minimum score, and the face extraction maximum number affect the respective precisions and processing speeds of the face detection processing and the subsequent processing in the image processing apparatus 1. The speed of the face detection processing becomes high when the face detection minimum size is large, while the precision of the face detection processing becomes high when it is small. The speed of the face detection processing becomes high when the face detection minimum score is large, while the precision of the face detection processing becomes high when it is small. In a case where the face extraction maximum number is large, when a lot of face images are included in the input image, and are detected by the face detection circuit 11, the face images are subjected to the subsequent processing in the image processing apparatus 1. In a case where the face extraction maximum number is small, the processing speed of the image processing apparatus 1 becomes high (a time period elapsed until the processing is terminated is shortened). The suitable (desirable) face detection minimum size, face detection minimum size, and face extraction maximum number may be inputted from the viewpoint of both the processing speed and the processing precision of the image processing apparatus 1.

As described in the foregoing, the input image data read out of the storage device 3 and applied to the image processing apparatus 1 is inputted to the face detection circuit 11. In the face detection circuit 11, an image representing the face of a character (a face image) included in the input image is detected by the pattern matching, as described above (step 22). When a matching score that is not less than the face detection minimum score is obtained, the face detection circuit 11 judges that the input image includes the face image. Data representing the results of the detection that are outputted from the face detection circuit 11 includes data (e.g., coordinates) representing the approximate center of the detected face image and data representing the approximate size of the face image (based on the size of a pattern used for the pattern matching).

When the input image includes a plurality of face images, the plurality of face images may, in some cases, be detected by the face detection circuit 11. In this case, data representing the center of each of the detected plurality of face images and data representing the size thereof are outputted from the face detection circuit 11. Description is now made on the premise that the input image includes the plurality of face images, and the plurality of face images are detected by the face detection circuit 11.

The data (data representing the center of each of the detected plurality of face images and data representing the size thereof) outputted from the face detection circuit 11 are applied to the face selection circuit 12. The detected number of face images is found by the number of data outputted from the face detection circuit 11. The face selection circuit 12 compares the detected number of face images with the face extraction maximum number (step 23).

The face selection circuit 12 is a circuit for selecting, when the detected number of face images is more than the face extraction maximum number, the face image to be subjected to the subsequent processing out of the detected face images. When the detected number of face images is not more than the face extraction maximum number, therefore, the face selection circuit 12 does not perform particular processing (No in step 23).

When the detected number of face images is more than the face extraction maximum number, the face selection circuit 12 performs processing for selecting, out of the detected face images, the face images corresponding to the face extraction maximum number (Yes in step 23, and step 24).

The face selection circuit 12 calculates the distance between the center of each of the detected plurality of face images and the center of the input image, to select the face images corresponding to the face extraction maximum number in the order of increasing calculated distances. This is image selection based on such an empirical rule that the closer an image is to the center of an input image, the more important the image is. Of course, the face image can be also selected from the viewpoint of the size of the face image, the magnitude of the matching score in the pattern matching, and others in addition to selecting the face image using the distance.

Data for specifying the face image selected by the face selection circuit 12 (in a case where the number of detected face images is more than the face extraction maximum number), and data representing the center and data representing the size of each of the detected plurality of face images are applied to a face vicinity cutout circuit 13 from the face selection circuit 12. Further, the same image data as the input image data applied to the face detection circuit 11 is applied to the face vicinity cutout circuit 13 from the storage device 3.

The face vicinity area cutout circuit 13 cuts out (partitions off), using the data representing the center and the data representing the size of each of the detected plurality of face images applied from the face selection circuit 12, a rectangular area including the face image included in the input image represented by the input image data (hereinafter referred to as a face vicinity area) (step 25).

Figure 3A:
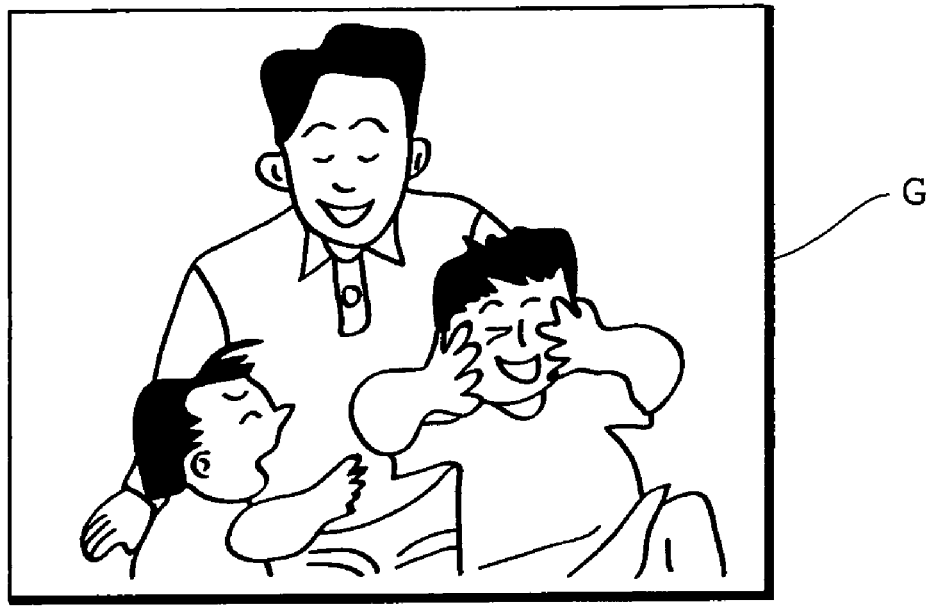
FIG. 3A shows an example of an input image.
Figure 3B:
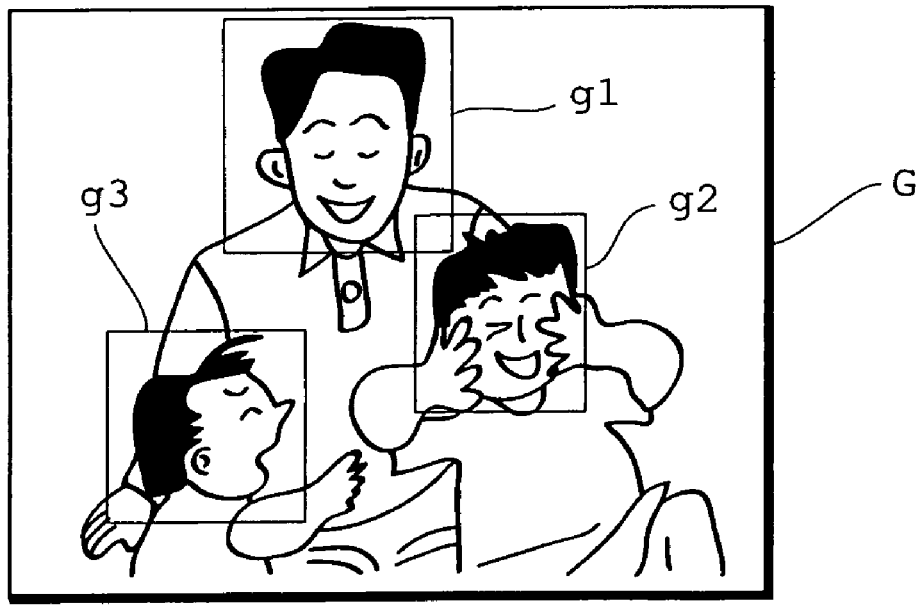
FIG. 3B shows an input image and a face vicinity area cut out from the input image.

FIG. 3A illustrates an example of an input image G, and FIG. 3B illustrates three rectangular face vicinity areas g1, g2, and g3 cut out (partitioned off) from the input image G. The respective positions of the face vicinity areas g1, g2, and g3 are based on data representing the approximate center of each of the plurality of face images applied from the face selection circuit 12. The respective sizes of the face vicinity areas g1, g2, and g3 are based on data representing the approximate size of each of the plurality of face images applied from the face selection circuit 12. That is, any of the face vicinity areas g1, g2, and g3 is an area completely including a face image (a face image area to be partitioned off) and also slightly extending from the face image. Each of the face vicinity areas g1, g2, and g3 is subjected to processing, described below. Description is made by specifically taking the face vicinity area g1 shown in FIG. 3B as an example. It is presupposed that in the face vicinity area g1 shown in FIG. 3B, the background of a character is white.

Image data representing the face vicinity area g1 is applied to a face size normalization processing circuit 14 from the face vicinity area cutout circuit 13. In the face size normalization processing circuit 14, image data representing the face vicinity area g1 is enlarged or reduced to a predetermined size (e.g., 256 pixels in height by 256 pixels in width) (step 26). From the face size normalization processing circuit 14, the image data of a predetermined size is outputted. If the image data applied to the face size normalization processing circuit 14 has already been of the predetermined size, it goes without saying that no particular processing is performed in the face size normalization processing circuit 14.

The image data representing the face vicinity area g1 whose size is normalized, outputted from the face size normalization processing circuit 14, is applied to a projection information creation circuit 15.

The projection information creation circuit 15 performs processing for extracting (partitioning off) a face area of a character (determining a boundary between the face area and the other area) from an image represented by the image data representing the face vicinity area in corporation with a skin-like color conversion circuit 16 and a boundary detection circuit 17 that are provided in the succeeding stages.

The processing performed by the projection information creation circuit 15 will be described while referring to FIGS. 4A to 6A.

The projection information creation circuit 15 uses a rectangular projection information creating window w, which is long in the width direction, having a width (length) that is one-half the width of the image data representing the face vicinity area whose size is normalized and having a predetermined height, to create projection information (projection information will be described later). The projection information creating window w is rotated through a predetermined angle at a time with the center of the face vicinity area as its axis, to create projection information using the projection information creating window w at each of angular positions.

Figure 4A:
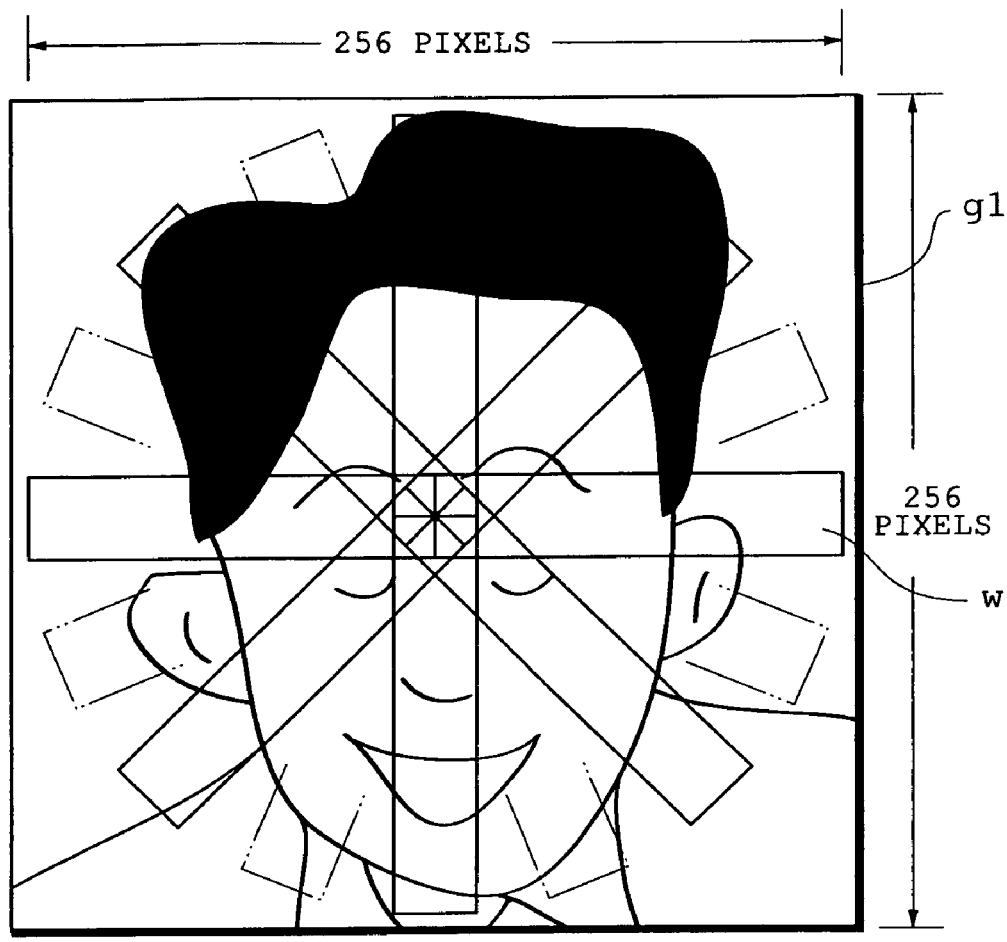
FIG. 4A shows a positional relationship between a face vicinity area image and a projection information creating window.
Figure 4B:
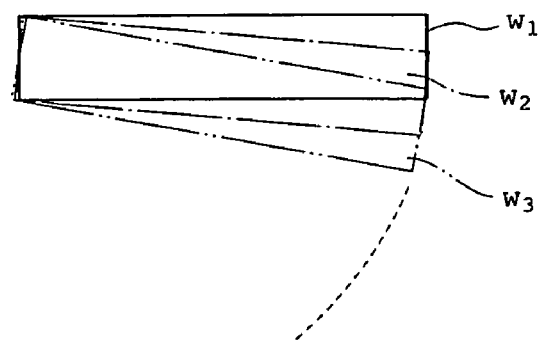
FIG. 4B shows how the projection information creating window is rotated.

FIG. 4A shows the positional relationship between the face vicinity area g1 and the projection information creating window w. In FIG. 4A, a plurality of rectangular areas that are overlapped with one another in the face vicinity area g1 are the projection information creating windows w. In the projection information creating window w, the center of a short side at its one end is aligned with the center of the face vicinity area g1 (this position is fixed). Assuming that the projection information creating window w is rotated through 5.26 degrees at a time, for example, with the center of the face vicinity area g1 as its axis (rotation axis), the projection information creating window w on the face vicinity area g1 faces 64 directions. At the angular positions in the 64 directions, 64 projection information are respectively created (the projection information creating windows w at all the angular positions (in 64 directions) are not illustrated for easy of understanding in FIG. 4A). FIG. 4B shows how the projection information creating window w is rotated through 5.26 degrees at a time (the projection information creating windows w1, w2, and w3 at the three adjacent angular positions in FIG. 4B). More than the respective haves of the projection information creating windows w at the adjacent angular positions are overlapped with each other. The reason why the rotation axis of the projection information creating window w is aligned with the center of the face vicinity area is that the rotation axis of the projection information creating window w can be positioned on a face image (within a face image area to be partitioned off) almost reliably if it is at the center of the face vicinity area. Further, the projection information creating window w has a length that is one-half the width of the face vicinity area, so that the other end of the projection information creating window w (an end on the opposite side of the rotation axis) is positioned on an image other than the face image (an area outside the face image area to be partitioned off). That is, the projection information creating window w crosses a boundary position between a face image (a face image area to be partitioned off) and an image other than the face image (an area other than the face image area to be partitioned off) at all angular positions.

Figure 5A:
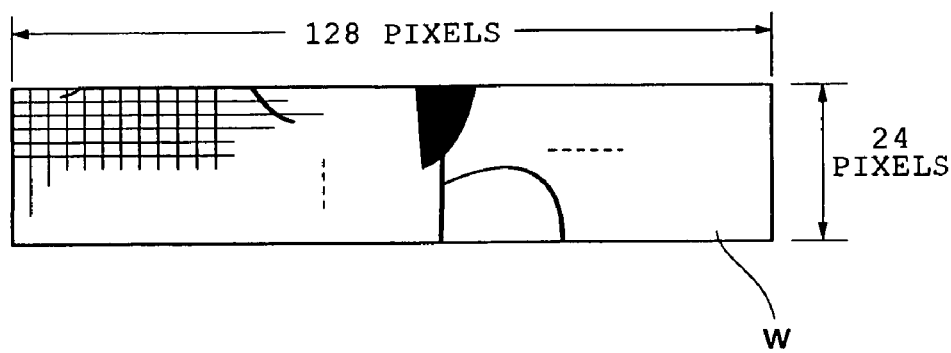
FIG. 5A shows an image portion within a projection information creating window.
Figure 5B:
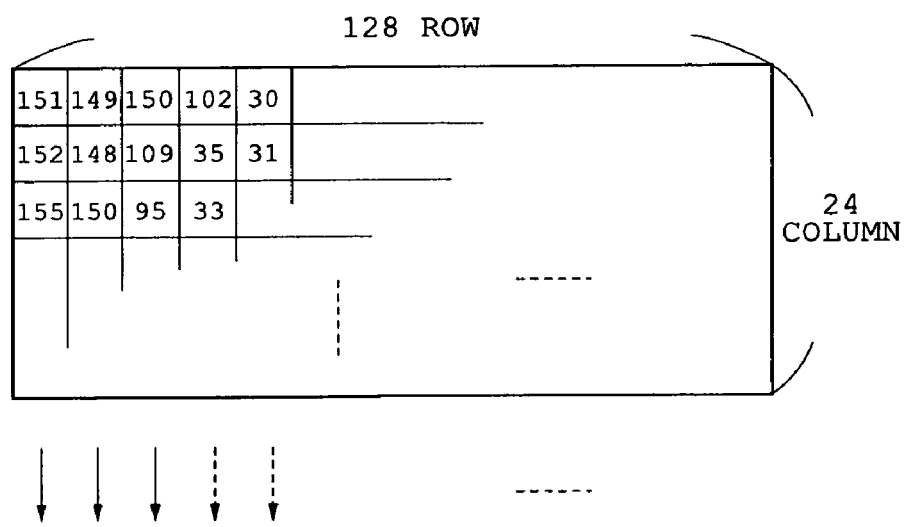
FIG. 5B shows a table storing a luminance value for each of pixels composing an image within the projection information creating window and projection information relating to the luminance value.

FIGS. 5A and 5B show how the projection information is created at each of the angular positions.

The projection information is created (calculated) in the following manner.

(1) A luminance value (Y), a red color difference value (Cr), and a blue color difference value (Cb) are acquired for each of pixels composing an image within the projection information creating window w. For example, assuming that the height (short side) of the projection information creating window w is composed of 24 pixels and the width (long side) thereof is composed of 128 pixels (see FIG. 5A), three table data respectively storing a total of 3072 (24 columns by 128 rows) luminance values (Y), 3072 red color difference values (Cr), and 3072 blue color difference values (Cb) are acquired. FIG. 5B shows table data storing the luminance value (Y). It goes without saying that the similar table data is also obtained with respect to each of the read color difference value (Cr) and the blue color difference value (Cb).

(2) With respect to each of the obtained three table data, values for each row are added (summed). For example, when the table data storing a total of 3072 (24 columns by 128 rows) luminance values (Y) shown in FIG. 5B is obtained, the sum in the row direction of the 128 luminance values (Y) is obtained. The sum in the row direction of the 128 luminance values (Y) is projection information relating to the luminance value (Y) within a projection information creating window. With respect to the red color difference value (Cr) and the blue color difference value (Cb), projection information (projection information relating to the red color difference value (Cr), and projection information relating to the blue color difference value (Cb)) are also similarly obtained (step 27).

Figure 6A:
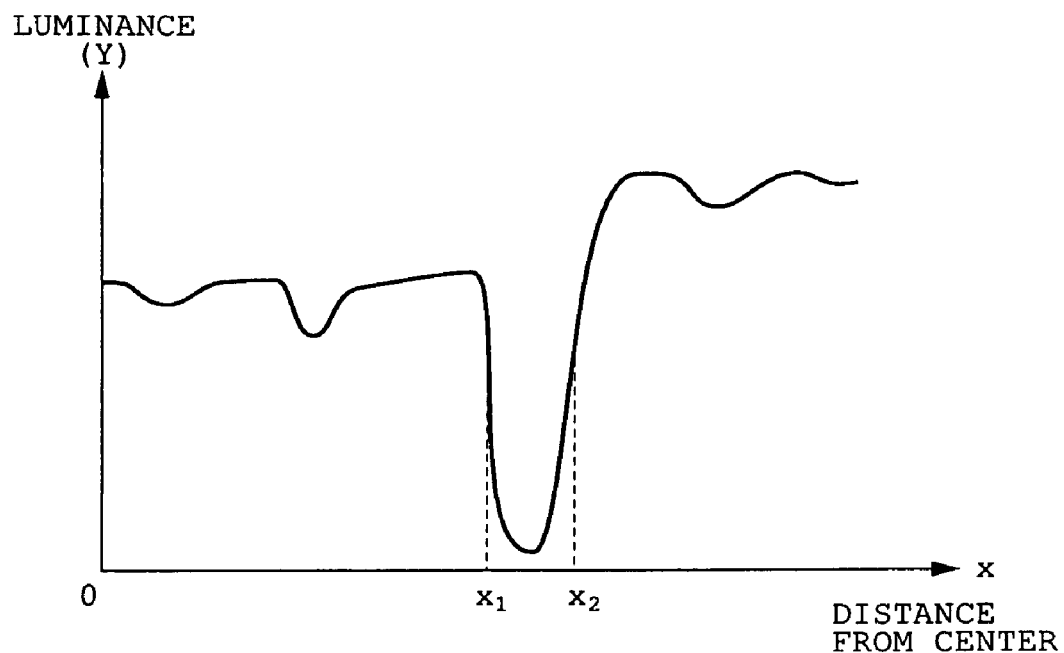
FIG. 6A is a graph showing projection information relating to a luminance value.

FIG. 6A is a graphical representation of the projection information relating to the luminance value (Y) obtained in the foregoing manner using the sum in the row direction of the luminance values (Y) to enter its vertical axis and using the distance x from the center of the face vicinity area to enter its horizontal axis. In the graph (projection information relating to the luminance value) shown in FIG. 6A, $x_1$ indicates an approximate boundary position between a skin area (a skin color) and hair (a black color) in the image portion within the projection information creating window w (the distance from the center of the face vicinity area). $x_2$ indicates an approximate boundary position between hair (a black color) and a background (a white color) in the image within the projection information creating window w.

Although the illustration of a graphical representation of the projection information relating to the red color difference value (Cr) and a graphical representation of the projection information relating to the blue color difference value (Cb) is omitted, the graphs are generally similar to that of the projection information relating to the luminance value (Y).

As can be seen from the graph shown in FIG. 6A (the projection information relating to the luminance value shown in FIG. 5B), it is possible to detect the approximate boundary position between a skin color area and the other area, that is, the approximate boundary position between the face area in the image within the projection information creating window w and the other area by utilizing the projection information itself. For example, the distance from the center at which the luminance value (Y) greatly varies in the minus direction (the distance $x_1$ from the center in the graph shown in FIG. 6A) may be determined as the approximate boundary position between the face area and the other area.

In order to further improve the detection precision, the boundary position is detected in the following manner instead of detecting the boundary position utilizing the projection information itself.

Processing for converting the relationship between the distance x from the center of the face vicinity area and the projection information (the sum in the row direction of the Y values, the Cr values, or the Cb values) (FIG. 6A) into the relationship between the distance x from the center of the face vicinity area and a value representing a skin-like color is performed. The conversion processing is performed by the skin-like color conversion circuit 16 (step 28).

The processing for converting the relationship between the distance x from the center of the face vicinity area and the projection information (the sum in the row direction of the Y, Cr, and Cb values) into the relationship between the distance x from the center of the face vicinity area and the value representing a skin-like color, which is performed by the skin-like color conversion circuit 16, is realized by the following equation;

$$P(x) = \sqrt{(Y(x) - Y(\text{skin}))^2 + (C_r(x) - C_r(\text{skin}))^2 + (C_b(x) - C_b(\text{skin}))^2} \quad \text{equation 1}$$

Here, Y(skin), Cr(skin), and Cb(skin) respectively denote the luminance value (Y), the red color difference value (Cr), and the blue color difference value (Cb) respectively representing the ideal skin color. In the equation 1, it is assumed Y(0)=Y(skin), Cr(0)=Cr(skin), and Cb(0)=Cb(skin).

Figure 6B:
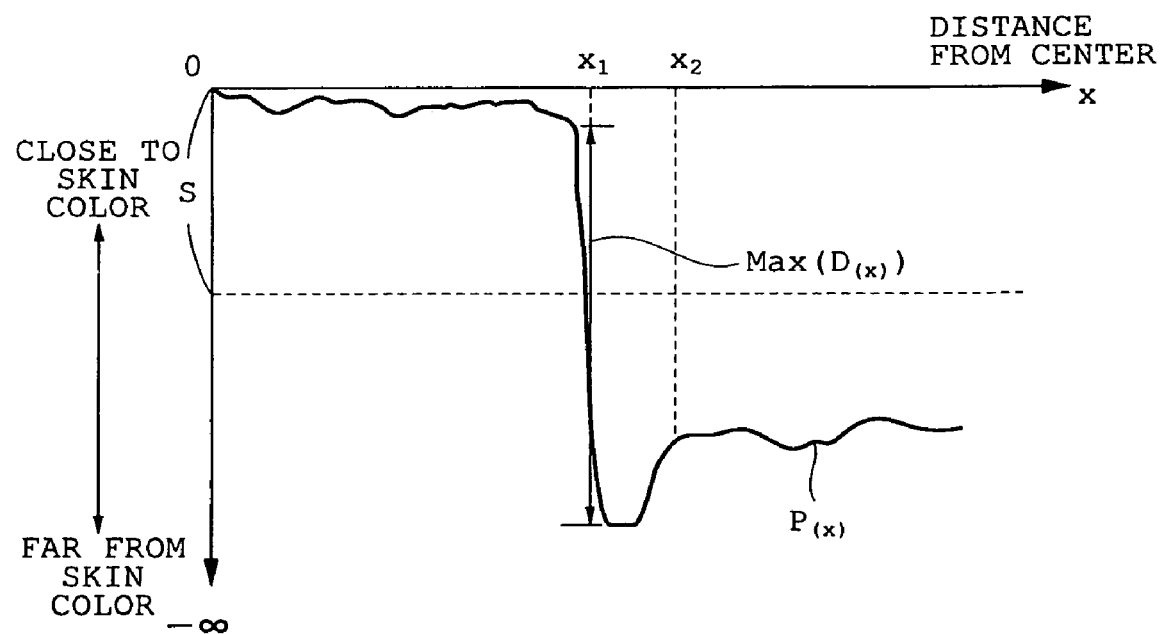
FIG. 6B is a graph after skin-like color conversion processing.

An example of a graph expressed on the basis of a value P(x) obtained by converting the projection information relating to the luminance value (Y), the red color difference value (Cr), and the blue color difference value (Cb), as shown in FIG. 6B.

As can be seen from the equation 1, P(x) representing the skin-like color after conversion (FIG. 6B) represents a distance from the ideal skin color. In the case of the ideal skin color, the skin-like color after conversion P(x) becomes zero. The farther the skin color is away apart from the ideal skin color, the larger the skin-like color after conversion P(x) becomes in the minus direction.

Here, a boundary position between the skin color and a color other than the skin color (the distance from the center of the face vicinity area) is x at which the maximum value obtained by the following equation 2 is calculated (the distance x from the center of the face vicinity area).

$$D(x)=(P(x-1)+P(x-2)+P(x-3))-(P(x+1)+P(x+2)+P(x+3)) \quad \text{equation 2}$$

Here, $P(x-1) \subseteq S$ and $P(x-2) \subseteq S$ and $P(x-3) \subseteq S$

S is a set of colors close to the skin color (see FIG. 6B: S is a set value)

A change position at which the skin color is (rapidly) changed into a color other than the skin color (the distance x from the center of the face vicinity area) is determined by the equation 2. The determined distance x from the center of the face vicinity area is determined as a boundary position between the skin color and the color other than the skin color in the image within the projection information creating window w, that is, a boundary position between the face area in the image portion within the projection information creating window w and the other area. Detection (determination) processing of the boundary position using the equation 2 is performed by the boundary detection circuit 17 (step 29).

A boundary position to be detected is a boundary position at which a skin color is changed into a color other than the skin color. In judgment based on the projection information (the graph shown in FIG. 6A), assuming that an image that is changed from a blue color to a red color is included in a background of a face area, for example, the possibility that a boundary position from the blue color to the red color is evaluated similarly to the boundary position at which the skin color is changed into the color other than the skin color is high. Further, when an image of an object in a skin color (or a color close to the skin color) exists in the background of the face area, there is a possibility that detection of a boundary position between the face area and the other area fails. However, the possibilities can be eliminated by using data representing a skin-like color, thereby improving the detection precision of the boundary position.

Figure 7A:
FIG. 7A shows a relationship between a face vicinity area image and a boundary position.

The above-mentioned boundary position is detected (determined) at the respective angular positions in the 64 directions, described above (No in step 30, and steps 27 to 29). 64 boundary positions are detected (determined). In FIG. 7A, the boundary position detected (determined) at each of the angular positions is marked with X (In FIG. 7A, all the 64 boundary positions are not marked for easy understanding).

Figure 7B:
FIG. 7B shows a separate mask image.

Data (coordinate data) representing the 64 boundary positions respectively detected (determined) at the angular positions in the 64 directions in the boundary detection circuit 17 and the image data relating to the face vicinity area g1 are applied to a mask creation circuit 18 (Yes in step 30). The mask creation circuit 18 creates image data representing a separate mask image (FIG. 7B) obtained by masking the outside of an area defined by connecting the adjacent boundary positions (step 31). An area (an inner area) defined by connecting the adjacent boundary positions is a face image area relating to a face image included in the face vicinity area g1, which is obtained by the image processing apparatus 1. Of course, when no skin color to be included in the face image area is included in an image portion in the vicinity of the determined boundary position (for example, when detection (determination) of the boundary position fails), the boundary position may be ignored to determine the face image area.

In the case of the image shown in FIGS. 3A and 3B, the above-mentioned processing is also performed with respect to the face vicinity area g2 and the face vicinity area g3 in addition to the face vicinity area g1 (No in step 32). Separate mask image data relating to each of the face vicinity area g2 and the face vicinity area g3 is created.

Figure 8:
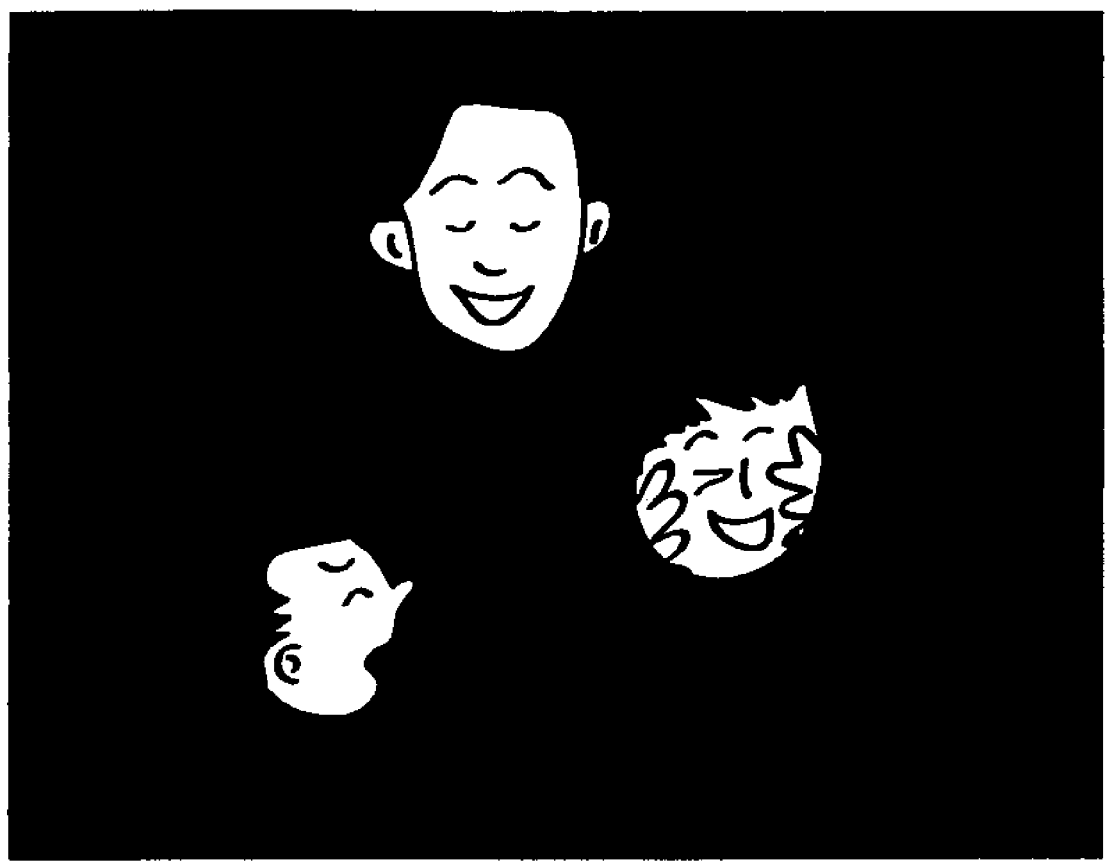
FIG. 8 shows a mask image.

When the processing of all the face vicinity areas is terminated (YES in step 32), the separate mask image data are synthesized and outputted (step 33). With respect to the image shown in FIGS. 3A and 3B, an image represented by the mask image data finally outputted from the mask creation circuit 18 is shown in FIG. 8.

Figure 9A:
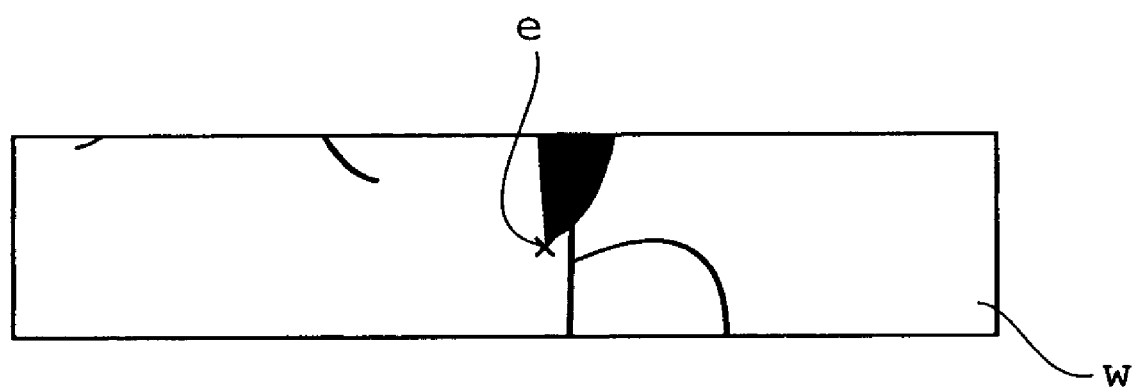
FIG. 9A shows a relationship between an image portion within a projection information creating window and a boundary position.
Figure 9B:
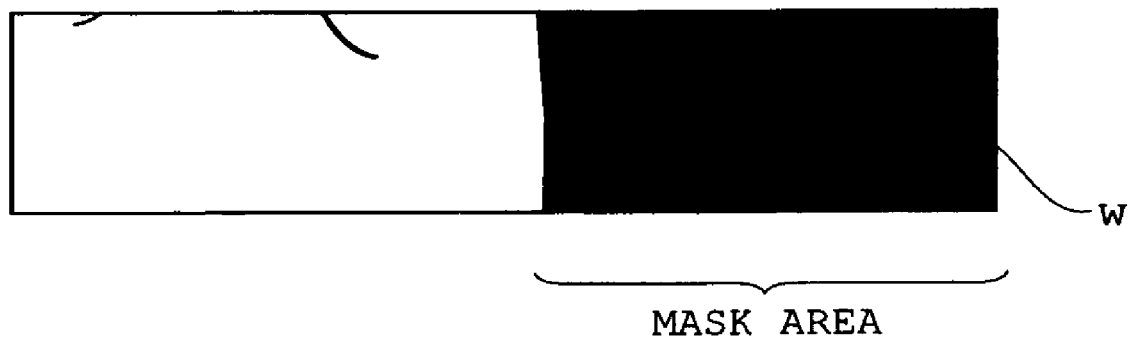
FIG. 9B shows an in-window mask image.

Although in the above-mentioned embodiment, the data (coordinate data) representing the 64 boundary positions respectively detected (determined) at the angular positions in the 64 directions in the boundary detection circuit 17 are applied to the mask creation circuit 18, and the image data representing the separate mask image obtained by masking the outside of the area defined by connecting the adjacent boundary positions is created in the mask creation circuit 18 after the data representing all the 64 boundary positions are collected (see FIGS. 7A and 7B), the mask image data relating to image portions within the projection information creating window w may be respectively created at the respective angular positions. FIG. 9A shows how one boundary position e is detected (determined) at a certain angular position. FIG. 9B shows an image (an in-window mask image) represented by mask image data created after one boundary position is detected (determined) at the certain angular position. In this case, an area outside the detected (determined) boundary position e is taken as a mask area. Image data representing 64 in-window mask images are synthesized (incorporated), to create data representing the separate mask image.

Although in the above-mentioned embodiment, the projection information creating window w is rotated with the center of the face vicinity area as its axis, it may be rotated with a position different from the center of the face vicinity area as its axis. The respective positions of both the eyes and the mouth of a character may be detected on the basis of a face image, representing the face of the character, included in the face vicinity area, and the rotation axis of the projection information creating window w may be set at an arbitrary position within a triangular area connecting the detected eyes and mouth.

Although in the above-mentioned embodiment, the projection information creating window w is rotated through 5.26 degrees at a time, to create the projection information with respect to each of the 64 directions and detect the boundary position, an angle at which the projection information creating window w is to be rotated may be suitably determined in consideration of the size (particularly, the height) of the projection information creating window w, the ratio of overlapping between the adjacent projection information creating windows w, and so forth. Further, it goes without saying that the input image data (image data representing the face vicinity area) itself may be rotated instead of rotating the projection information creating window w.

Furthermore, although in the above-mentioned embodiment, the rectangular projection information creating window w that is long in the width direction is used, the shape of the projection information creating window w is not limited to the rectangular shape. For example, a trapezoidal projection information creating window, a fan-shaped projection information creating window, and projection information creating windows in the other shapes may be used. When the projection information creating window in a shape other than the rectangular shape is used, the above-mentioned sum in the row direction is corrected to a value that is normalized depending on the number of pixels in the row direction.

The image processing apparatus 1 can be realized by a hardware circuit, or a part or the whole thereof may be realized by software (a program), as in the above-mentioned embodiment.

Figure 10:
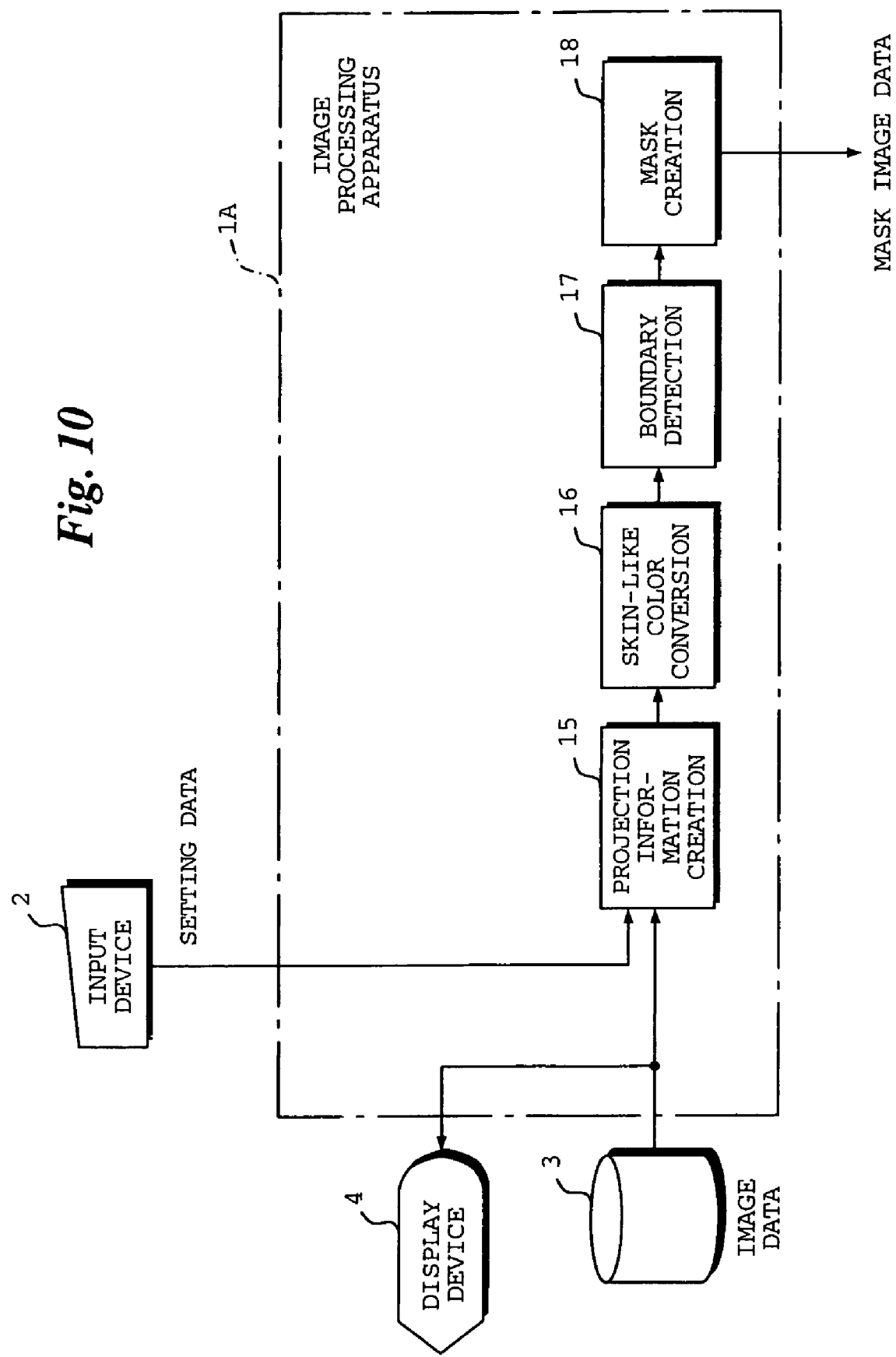
FIG. 10 is a block diagram showing the electrical configuration of an image processing apparatus according to a second embodiment.

FIG. 10 is a block diagram showing the electrical configuration of an image processing apparatus 1A according to a second embodiment. The image processing apparatus 1A differs from the image processing apparatus 1 according to the first embodiment shown in FIG. 1 in that the face detection circuit 11, the face selection circuit 12, the face vicinity area cutout circuit 13, and the face size normalization processing circuit 14 are not provided. Further, a display device 4 for displaying an image based on image data read out of a storage device 3 is connected to the image processing apparatus 1A.

As described above, in the image processing apparatus 1 according to the first embodiment, the position of the rotation axis of the projection information creating window w is set to the center of the face vicinity area cut out automatically, that is, by the face vicinity area cutout circuit 13. On the other hand, in the image processing apparatus 1A according to the second embodiment, the position (and the length) of the rotation axis of a projection information creating window w is determined on the basis of setting data inputted by a user using an input device 2.

In the image processing apparatus 1A, the image based on the image data serving as a processing object is displayed on a display screen of the display device 4. The user uses the image displayed on the display screen of the display device 4 and the input device (a keyboard, a mouse, etc.), to input setting data, described in detail below.

FIGS. 11A to 14B illustrate the relationship between the contents of the setting data inputted from the input device 2 and a state where the projection information creating window w is set based on the setting data.

SET EXAMPLE 1

Figure 11A:
FIG. 11A shows an example of projection information creating window setting data to be inputted.
Figure 11B:
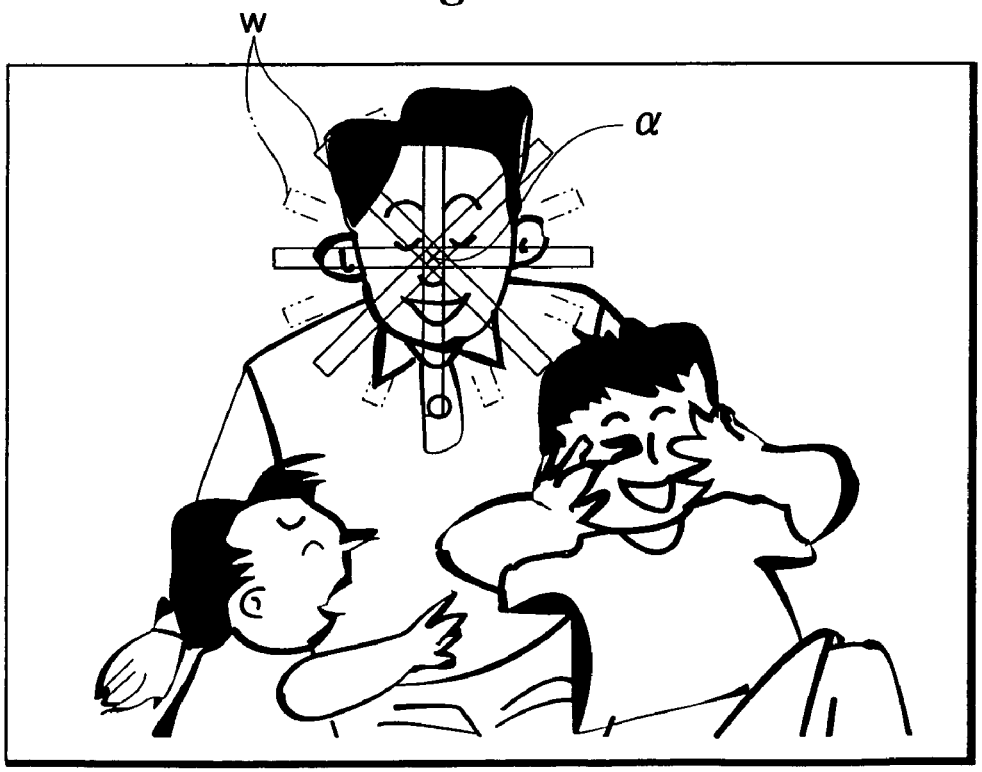
FIG. 11B shows a state where a projection information creating window is set based on the inputted setting data.

In a set example 1, an arbitrary position a on a face image included in an image represented by image data serving as a processing object displayed on the display screen of the display device 4 is designated by the user using the input device 2 (FIG. 11A). The rotation axis (one end) of the projection information creating window w is set at the designated position a (FIG. 11B).

The projection information creating window w may have such a length (width) that it reaches a peripheral edge of the image represented by the image data serving as a processing object. The user may adjust the length previously set. The projection information creating window w may have such a length that the other end of the projection information creating window w (an end on the opposite side of the rotation axis (one end) of the projection information creating window w) reaches an image other than the face image. In any case, the projection information creating window w crosses the boundary between the face image and the image other than the face image at all angular positions. The same is true for other set examples, described below.

The projection information creating window w may have such a length that it reaches a face image different from a face image serving as a processing object. As described above, a boundary position to be detected is the position at which a skin color is changed into a color other than the skin color. The position at which a color other than a skin color is changed into the skin color can be excluded from the boundary position to be detected. However, it is preferable that the length of the projection information creating window w is as small as possible from the viewpoint of processing speed and processing efficiency.

SET EXAMPLE 2

Figure 12A:
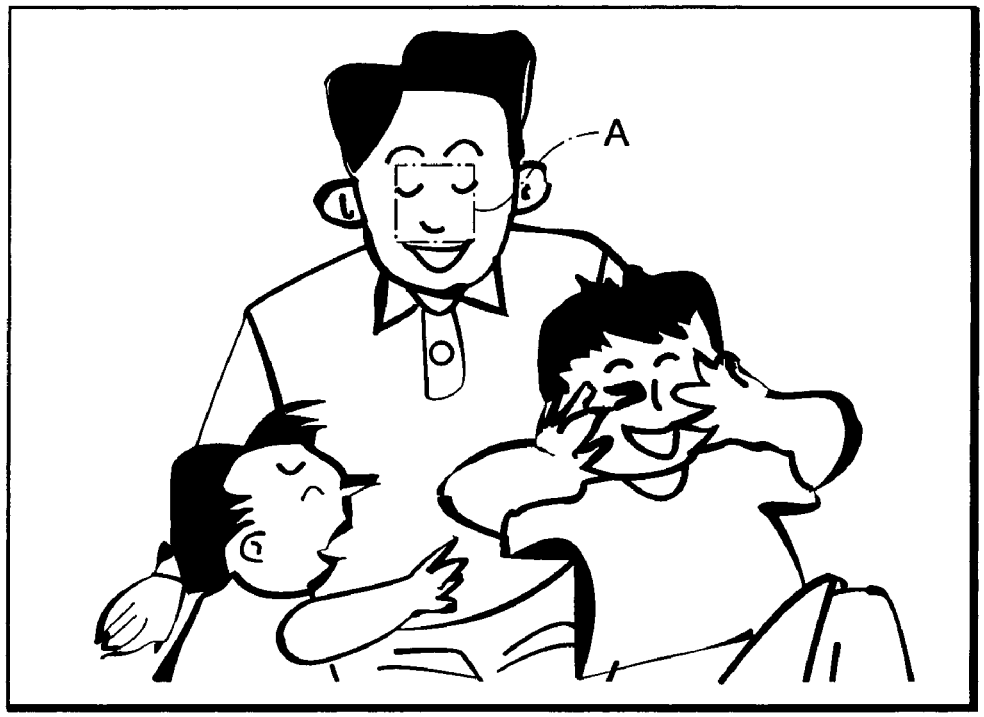
FIG. 12A shows another example of projection information creating window setting data to be inputted.
Figure 12B:
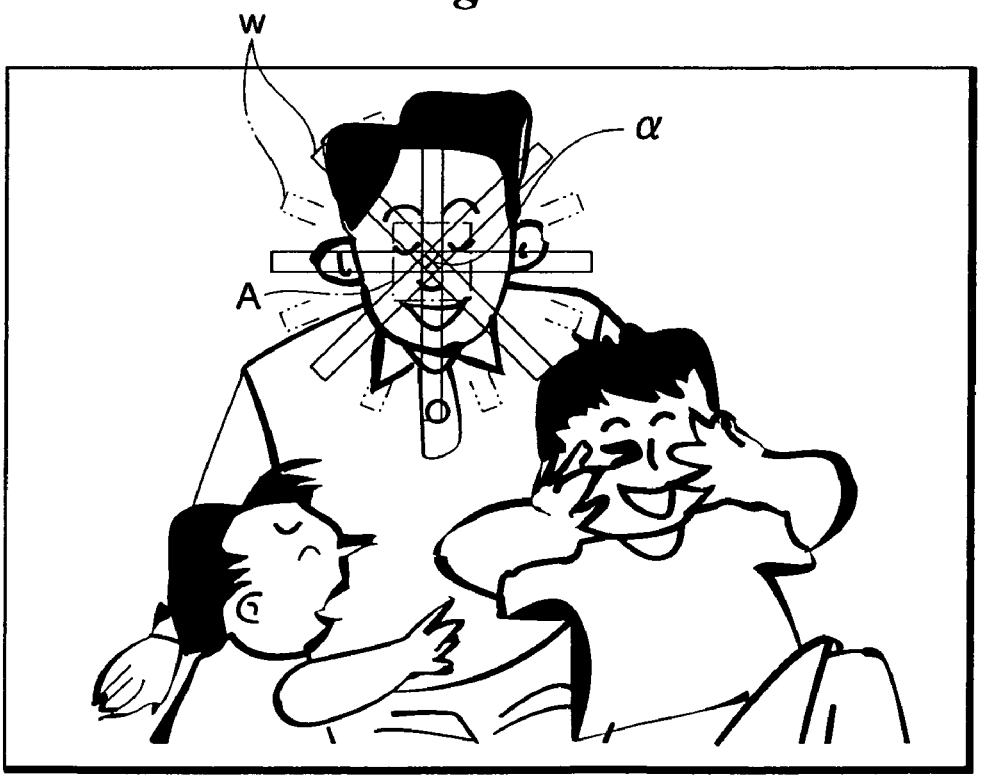
FIG. 12B shows a state where a projection information creating window is set based on the inputted setting data.

A set example 2 is an example in which within a face image area to be partitioned off, an area not exceeding the face image area is set, and the rotation axis of the projection information creating window w is positioned within the set area. For example, an arbitrary position on the face image area is clicked using a mouse, and the mouse is moved (drugged) with the position clicked, to release the clicking at another arbitrary position on the face image area (a position other than the clicked position). A rectangular area A with the clicked position as its upper left corner and the position at which the clicking is released as its lower right corner is set within the face image area to be partitioned off (FIG. 12A). The rotation axis of the projection information creating window w is set at an arbitrary position within the rectangular area A (FIG. 12B). For example, the rotation axis of the projection information creating window w can be positioned at the center of the rectangular area A. The projection information creating window w may have such a length that it reaches a peripheral edge of an image represented by image data serving as a processing object, as in the above-mentioned set example 1. A length previously set may be adjusted by the user.

SET EXAMPLE 3

Figure 13A:
FIG. 13A shows still another example of projection information creating window setting data to be inputted.
Figure 13B:
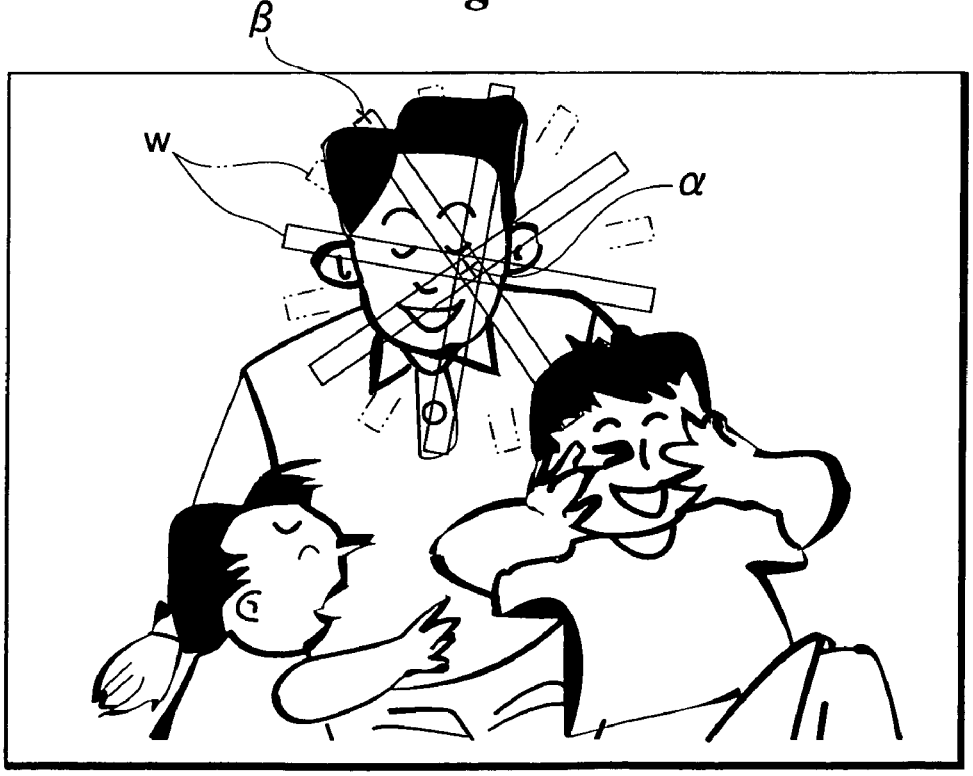
FIG. 13B shows a state where a projection information creating window is set based on the inputted setting data.

In a set example 3, the position (a position at one end) α of the rotation axis of a projection information creating window w and a position at the other end β of the projection information creating window w are designated using an input device 2 (FIG. 13A) A projection information creating window w having a length from the position at one end α to the position at the other end β with the position at one end α as its central axis is set (FIG. 13B).

SET EXAMPLE 4

Figure 14A:
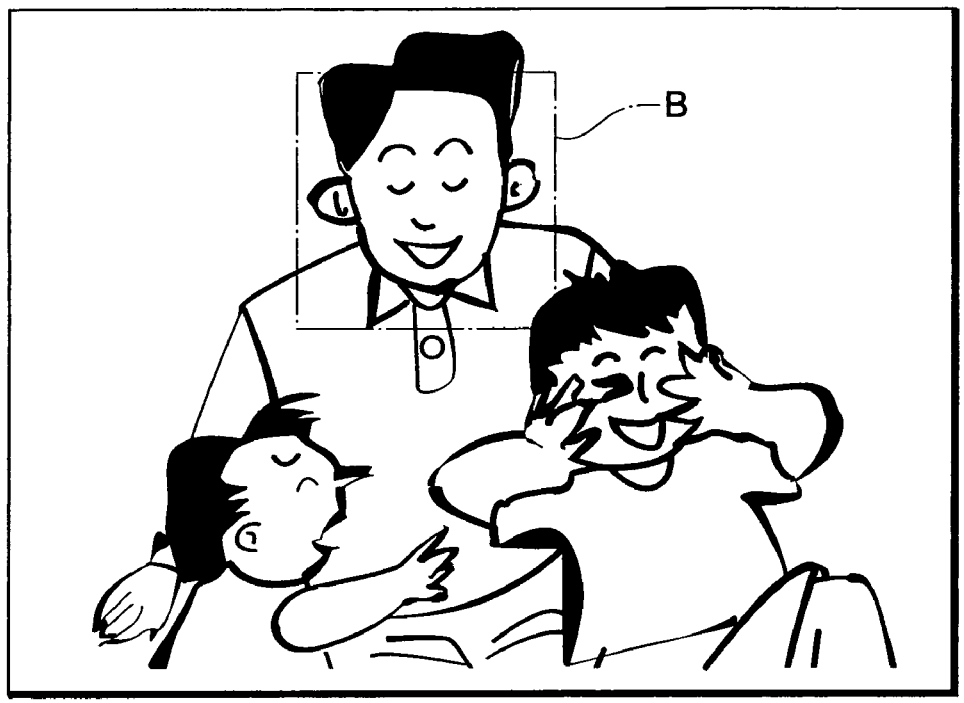
FIG. 14A shows still another example of projection information creating window setting data to be inputted.
Figure 14B:
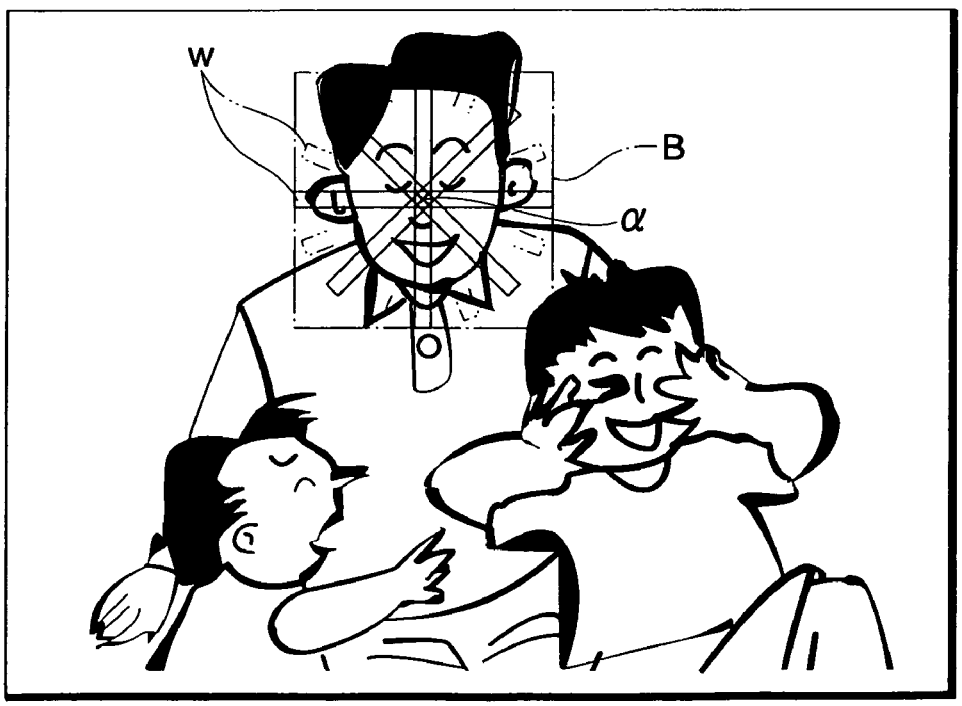
FIG. 14B shows a state where a projection information creating window is set based on the inputted setting data.

In a set example 4, an area B including the whole of a face image area to be partitioned off and slightly extending from the face image area to be partitioned off is set (FIG. 14A). For example, the center α of the area B is taken as the position of the rotation axis of a projection information creating window w. The length of the projection information creating window w may be set to a length from the center α to a peripheral edge of the area B (FIG. 14B).

Processing after setting the position (and the length) of the rotation axis of the projection information creating window w is the same as that in the first embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A particular image area partitioning apparatus comprising:

particular image detection device for detecting whether or not a particular image is included in an image represented by applied image data;

projection information creation device for setting, when the particular image is detected by the particular image detection device, a plurality of projection information creating windows having a predetermined shape radially from an arbitrary point represented by the image data including the detected particular image, and creating, with respect to each of image portions within the set plurality of projection information creating windows, projection information obtained by adding pixel information for each unit pixel position in the radial directions from the arbitrary point, wherein each of the plurality of projection information creating windows has a width along the radial direction and a height perpendicular to the radial direction, and the addition of the pixel information adds pixel information in a vertical direction along the height within the set plurality of projection information creating windows;

boundary position determination device for determining, with respect to each of the image portions within the plurality of projection information creating windows, a boundary position between the particular image and an image other than the particular image on the basis of the projection information for unit pixel position obtained by the projection information creation device; and particular area determination device for determining a particular image area by connecting the plurality of boundary positions, adjacent to one another, determined by the boundary position determination device.

2. The particular image area partitioning apparatus according to claim 1, further comprising conversion device for converting each of the plurality of projection information created by the projection information creation device into data representing the distance between the added pixel information, for each unit pixel position, included in the projection information and particular pixel information to be included in the particular image, the boundary position determination device determining, with respect to each of the image portions within the plurality of projection information creating windows, a boundary position between the particular image and the image other than the particular image on the basis of the distance data for each unit pixel position obtained by the conversion device.

3. The particular image area partitioning apparatus according to claim 2, wherein the boundary position determination device determines, on the basis of the plurality of distance data at the plurality of pixel positions adjacent to one another, the pixel position at which the distance data varies most greatly as the boundary position between the particular image and the image other than the particular image.

4. The particular image area partitioning apparatus according to claim 1, wherein the projection information creating window is set so as to be overlapped with the other projection information creating window adjacent thereto.

5. The particular image area partitioning apparatus according to claim 1, further comprising cutout device for cutting out from the image data, when the particular image is detected by the particular image detection device, image data representing an area including the detected particular image and slightly extending from the particular image, the projection information creation device setting the plurality of projection information creating windows having a predetermined shape radially from the center of a cut image represented by the image data cut out by the cutout device.

6. The particular image area partitioning apparatus according to claim 5, wherein the projection information creating window is rotated through a predetermined angle at a time with the center of the cut image represented by the image data cut out by the cutout device as its axis, to set the plurality of projection information creating windows radially.

7. The particular image area partitioning apparatus according to claim 5, wherein the image data cut out by the cutout device is rotated through a predetermined angle at a time with the center of the cut image represented by the cut image data as its axis, to set the plurality of projection information creating windows.

8. The apparatus of claim 1, wherein each of the plurality of projection information creating windows has a rectangular shape.

9. The apparatus of claim 8, wherein the projection information creation device sets the width of the projection information creating windows in the radial directions and obtains projection information by adding, for each unit pixel position, pixel information across the height of each of the plurality of projection information creating windows, and subsequent to the addition, the boundary position determination device determines a boundary as a discontinuity in projection information in the width direction.

10. A tangible computer-readable medium comprising a program for causing a computer to perform:

processing for detecting whether or not a particular image is included in an image represented by image data applied from a storage device;

processing for setting, when the particular image is detected, a plurality of projection information creating windows having a predetermined shape radially from an arbitrary point represented by the image data including the detected particular image, and creating, with respect to each of image portions within the set plurality of projection information creating windows, projection information obtained by adding pixel information for each unit pixel position in the radial positions from the arbitrary point, wherein each of the plurality of projection information creating windows has a width along the radial direction and a height along the radial direction, and the addition of the pixel information adds pixel information in a vertical direction along the height within the set plurality of projection information creating windows;

processing for determining, with respect to each of the image portions within the plurality of projection information creating windows, a boundary position between the particular image and an image other than the particular image on the basis of the created projection information for each unit pixel position; and processing for determining a particular image area by connecting the determined plurality of boundary positions adjacent to one another.

11. The computer-readable medium according to claim 10, wherein the computer is further caused to perform processing for converting each of the created plurality of projection information into data representing the distance between the added pixel information for each unit pixel position and particular pixel information to be included in the particular image, and the boundary position between the particular image and the image other than the particular image is determined, with respect to each of the image portions within the plurality of projection information creating windows, on the basis of the distance data for each unit pixel position obtained by the conversion processing.

12. A particular image area partitioning apparatus comprising:

a projection information creation device for setting a plurality of projection information creating windows each having such a predetermined shape that its one end is positioned at an arbitrary point on a particular image included in an image represented by applied image data and the other end is positioned on an image other than the particular image radially from the arbitrary point, and creating projection information obtained by adding, with respect to each of image portions within the set plurality of projection information creating windows, pixel information for each unit pixel position in the radial directions from the arbitrary point, wherein each of the plurality of projection information creating windows has a width along the radial direction and a height perpendicular to the radial direction, and the addition of the pixel information adds pixel information in a vertical direction along the height within the set plurality of projection information creating windows;

a boundary position determination device for determining, with respect to each of the image portions within the plurality of projection information creating windows, a boundary position between the particular image and the image other than the particular image on the basis of the projection information for each unit pixel position obtained by the projection information creation device; and a particular area determination device for determining a particular image area by connecting the plurality of boundary positions, adjacent to one another, determined by the boundary position determination device.

13. The particular image area partitioning apparatus according to claim 12, further comprising a display device that displays the image represented by the applied image data, and an input device that accepts designation of the arbitrary point on the particular image included in the image displayed on the display device.

14. The particular image area partitioning apparatus according to claim 12, further comprising a display device that displays the image represented by the applied image data, an input device that accepts designation of the arbitrary area on the particular image included in the image displayed on the display device, and device for determining as the arbitrary point an arbitrary portion within the arbitrary area designated by the input device.

15. The particular image area partitioning apparatus according to claim 12, further comprising a display device that displays the image represented by the applied image data, an input device that accepts designation of an area including the particular image included in the image displayed on the display device and slightly extending from the particular image, and device for determining as the arbitrary point the center of the area designated by the input device.

16. The particular image area partitioning apparatus according to any one of claims 13 to 15, wherein the input device further accepts input of data for defining the length of the projection information creating window.

17. The particular image area partitioning apparatus according to claim 12, further comprising device for determining the arbitrary point utilizing characteristics inherent in the particular image included in the image represented by the applied image data.

18. The particular image area partitioning apparatus according to claim 17, wherein the particular image is a face image representing the face of a character, the arbitrary point determination device detects the positions of both the eyes and the mouth of the character included in the face image and determines as the arbitrary point an arbitrary portion within a triangular area connecting the detected eyes and mouth.

19. A tangible computer-readable medium comprising a program for causing a computer to perform:

projection information creation processing for setting a plurality of projection information creating windows each having such a predetermined shape that its one end is positioned at an arbitrary point on a particular image included in an image represented by applied image data and the other end is positioned on an image other than the particular image radially from the arbitrary point, and creating, with respect to each of image portions within the set plurality of projection information creating windows, projection information obtained by adding pixel information for each unit pixel position in the radial directions from the arbitrary point, wherein each of the plurality of projection information creating windows has a width along the radial direction and a height perpendicular to the radial direction, and the addition of the pixel information adds pixel information in a vertical direction along the height within the set plurality of projection information creating windows;

boundary position determination processing for determining, with respect to each of the image portions within the plurality of projection information creating windows, a boundary position between the particular image and the image other than the particular image on the basis of the created projection information for each unit pixel position; and particular area determination processing for determining a particular image area by connecting the determined plurality of boundary positions adjacent to one another.

* * * * *